United States Patent
Ward

[15] 3,652,326
[45] Mar. 28, 1972

[54] SIZING COMPOSITION AND GLASS FIBERS TREATED THEREWITH

[72] Inventor: John E. Ward, Houghton, Mich.
[73] Assignee: Owens-Corning Fiberglas Corporation
[22] Filed: Apr. 3, 1970
[21] Appl. No.: 25,584

[52] U.S. Cl. .....................117/126 GE, 117/4, 117/161 ZB, 260/830 TW
[51] Int. Cl. .........................................................C03c 25/02
[58] Field of Search................117/126 GE, 126 GB, 161 ZB, 117/4; 260/830 TW

[56] References Cited

UNITED STATES PATENTS 3,459,585   8/1969   Killmeyer et al. ...............117/126 GE

*Primary Examiner*—William D. Martin
*Assistant Examiner*—D. Cohen
*Attorney*—Staelin & Overman

[57] ABSTRACT

A sizing for glass fibers, comprising water soluble epoxy resins, an organosilane, polyvinyl acetate copolymer and a lubricant is provided, whereby the sized glass fibers in the form of strands possess excellent integrity.

4 Claims, No Drawings

SIZING COMPOSITION AND GLASS FIBERS TREATED THEREWITH

BACKGROUND OF THE INVENTION

This invention relates to glass structures such as glass fibers in which the surface characteristics of the glass structure have been modified to enable the glass fibers, in strand form, to be chopped without losing their integrity, while possessing other favorable characteristics. Some of the other favorable characteristics possessed by the chopped strands include: flowability of the chopped strands during processing, mixing, handling, conveying and molding within a resinous matrix; low bulk density; heat resistance; lightness of color; and the chopped strands impart high impact strengths to resinous matrices due to a strong bonding relationship between the sized chopped strands and the resinous materials, whether thermoset or thermoplastic.

Difficulties in the establishment of a chopped glass strand that possesses integrity during processing, flowability during processing, lightness in color and which imparts high impact strengths to resinous matrices are well known in the art.

From the time of formation of glass fibers to the more distant point in time of their incorporation into a resin matrix to reinforce the same, many processing operations will have had to be carried out. Immediately after the glass fibers are formed and traveling at linear speeds in excess of 10,000 ft./min. a protective coating is applied to the glass fibers to prevent mutual abrasion. Subsequently, the sized fibers are gathered onto a rotating collection package or routed directly to a chopping apparatus where the glass strands are chopped into lengths ranging from one-eighth to three-eighth inches.

When the strands are gathered onto a package it is preferable to dry the package prior to positioning the package on a creel with numerous other packages, so that a plurality of sized strands may be subsequently fed to a chopping machine. When the strands are fed directly to the chopper, the drying may be prior to or subsequent to chopping. When the strands are dried prior to being chopped a less integral strand results whereas when the strands are chopped subsequent to chopping a highly integral strand results. Because of the differences in integrity the amount of solids of the sizing on the glass fibers may be adjusted accordingly to compensate therefor.

Subsequent to chopping, the chopped strands may be either packaged for a later use or be combined and mixed with a resinous material to form a premix which is used as a molding compound. Finally the molding compound may be either packaged for subsequent use or may be immediately used in a molding operation to form reinforced articles.

The treatment applied to the glass fibers at forming must be multifunctional for the purposes of this invention. It must be capable of protecting the individual fibers from mutual abrasion, capable of holding the strand in an integral unit before, during, and after chopping, capable of exhibiting antistatic characteristics so that during handling, conveying, mixing and molding, the chopped strands have flowability and capable of a strong bonding relationship with a resinous matrix that is to be reinforced.

Difficulties in the establishment of a strong and permanent bonding relationship between the surfaces of glass fibers and a resinous material have in general become well known in the art. Because of the non-porous character of glass fibers, as distinguished from a high degree of porosity available in natural fibers such as the fibers of cellulose, wool, cotton, hemp and the like, penetration of resinous materials into the fibers is not available for use in establishing a bonding relationship between such glass fibers and a resinous material. Because glass fibers naturally form into elongate rods having very smooth surfaces, as distinguished from the rough surface characteristics of natural fibers, a gripping relationship or a mechanical bonding is difficult to establish between resinous materials and the untreated glass fiber surfaces. Thus a physical anchorage of the type relied upon chiefly for the establishment of a bonding relationship between natural fibers and resinous materials is not capable of being developed with glass fibers. Glass fibers may be etched or roughened to present a surface of some porosity but desirable strength characteristics of the glass surfaces are simultaneously lost.

In the absence of the ability to make use of physical forces in bonding, it becomes necessary to rely upon the development of a relationship requiring chemical bonding or physical - chemical forces based upon molecular or ionic attraction and the like. With synthetic resinous fibers, e.g., nylon, polyester, etc., a strong bonding relationship can be developed with the smooth surfaces because such fibrous materials are resinophilic in character and therefore are preferentially receptive to resinous treating materials. In addition, the resinous materials, of which the fibers are formed, have the ability of being softened by heat or solvent in a manner to enable the development of a desired bonding relationship with the applied treating material. Such chemical forces resulting from the softening of the synthetic fiber surfaces are not available with glass fibers because the glass fibers are inert to heat and solvents and because the glass fiber surfaces are dominated by groups that are hydrophilic in character and therefore receive moisture in preference to resinous materials. As a result, only a weak bonding relationship is capable of being established in the first instance and even this limited bonding is reduced in the presence of moisture or high humidity sufficient to cause a moisture film to form and separate the resinous coating from the glass fiber surfaces with a moisture interface.

When a strong bonding relationship cannot be established between glass fibers and a resinous material used in combination therewith, maximum utilization of the strength properties of the glass fibers cannot be made available in the products that are formed. Even where a fair bonding relationship between glass and resin can be established under extremely dry conditions, the strength properties of the glass fiber reinforced plastic composite depreciates greatly under high humidity conditions or in the presence of moisture.

When glass fibers are formed into strands, containing many fibers, and the strands are subsequently chopped into lengths of from about one-eighth inch to about three-eighth inch, it is desirable to have the chopped strand possess integrity. That is, after chopping it is desired to have the strand in a rod-like manner without the many fibers making up the strand separating from the rod-like structure. The desirability of this rod-like structure is important when a resinous matrix is to be reinforced with glass fibers to improve strength and other characteristics. Another desirable characteristic of the chopped strands of this invention is that they have a high degree of flowability during processing, especially within the resin matrix that is to be reinforced so that the chopped strands have a uniform dispersement within the matrix and not be heavily grouped in one local concentration and void of chopped strands in another concentration.

It is therefore an object of this invention to produce a treatment for glass fibers and to produce glass fibers treated with a material to enable the glass fibers, in strand form, to be chopped without losing their integrity during processing.

It is another object of the invention to provide a new and improved coating for glass fibers so that the coated fibers, when gathered into a strand, chopped, and subsequently used as a chopped reinforcement in resinous matrices, remain flexible and substantially insoluble in the matrices.

It is another object to produce glass fibers, which when chopped, possess good flowability characteristics during processing.

It is still another object to produce glass fibers, which when incorporated with a resinous matrix, exhibits a strong bonding relationship with the matrix.

Further objects and advantages of the invention will become apparent to those skilled in the art to which the invention relates from the following description.

Flowability of chopped strands becomes extremely important during the introduction of the treated strands to the chopper. It is desirable to obtain chopped strands of uniform length, but this becomes difficult when the chopper becomes clogged with previously chopped fibers. Static forces are set up on chopping and must be combated.

The lack of strand integrity during processing is more than a problem. It is detrimental to the uniform distribution of chopped strands within a resinous matrix because the strands agglomerate or clump together. When a thermosetting matrix is to be reinforced, a premix, comprising the chopped strands and the resin, is formed. When a thermoplastic matrix is to be reinforced, the chopped strands and resin are introduced into an injection molding machine as a dry blend via vibration. If filamentation of the chopped strands occurs, the strands will tend to stick together through physical or static forces, and cause a non-uniform distribution of the strands into the matrix, or a non-uniform distribution of the strands into the injection molding machine.

The degree of integrity possessed by the chopped strands becomes extremely important when the strands are incorporated with a resinous matrix. During the incorporation it is desirable to obtain some filamentizing of the strand sufficient to increase the surface area of available reinforcement, but insufficient to be incapable of actual reinforcement. It has been found that when the strands have no degree of filamentation upon incorporation with a resinous material, strengths of the composite are low. The same phenomenon is present when there is no integrity of the chopped strand after incorporation of the strand with the resinous matrix. Therefore, a compromise between a highly integrated strand and a highly filamentized strand must be reached. Chemical as well as physical forces contribute to the degree of filamentation of the treated strand, after incorporation into a resinous matrix.

The inventive treatment, hereinafter described in greater detail, provides all of the advantages as above described.

SUMMARY OF THE INVENTION

According to the present invention it has been discovered that impact strengths of resinous matrices reinforced by short lengths of glass fibers are greatly increased if the short length of fibers are in the form of a strand having some degree of filamentation, rather than dispersed throughout the resin as individual filaments or small groups of filaments. The inventive treatment which bonds the fibers together into a strand is of low or intermediate molecular weight, so that it is flexible, but is crosslinked to a relatively insoluble degree and capable of holding the fibers together in the form of a strand during processing. Residual reactivity of the treatment provides a controlled bonding between the treatment on the strands and the matrix resin.

According to the invention, the film former within the treatment is capable of partial reaction during the fiber forming operation to form an integral strand and it is capable of further reaction when incorporated in a resinous matrix, to provide a controlled degree of attachment between the surface of the fibers and the matrix resin. The coating on the fibers is generally immobile or in a solid state, and the degree of bonding which is achieved between the strand coating and the matrix resin is a limited or controlled one, which allows the bond between the strand and the matrix resin to yield under a concentrated load, such as occurs during impact. Concentrated loads cause some of these bonds to be broken to allow the strand to move. It appears that some degree of filamentation of the treated strand is necessary upon incorporation of the strand with the resin matrix so that a synergistic system is developed.

In a preferred form of the invention, individual glass fibers are coated at forming with a water dispersion comprising a low or intermediate molecular weight polyvinyl acetate copolymer, a metal acid catalyst, and a combination of epoxy resins modified to act as lubricants. After the individual fibers are coated with the dispersion, they are gathered together into a strand and collected on a package and dried at a temperature which causes the polyvinyl acetate copolymer to crosslink. The crosslinking of the polyvinyl acetate copolymer causes the coating to set up sufficiently, so that it is flexible but substantially insoluble in a solution of matrix resin. The matrix resin may be a styrene solution of a crosslinking polyester resin, or may be an organic solution of some other unsaturate such as polypropylene, polyethylene, or polystyrene. When the coated strand is mixed with the matrix resin and cured at a temperature above the drying temperature employed at forming to crosslink the coating material, a polymerization of the matrix resin is produced, and a limited number of bonds are formed between the surface of the strand coating and the matrix resin. The limited number of bonds between the solid coating material and the matrix resin becomes sequentially broken when subjected to concentrated loads, to allow a yielding of the matrix resin relative to the strand, and a consequent redistribution of the load over a number of strands. In addition, the coated strands are "locked" into the resin matrix mechanically upon polymerization of the resin matrix. A considerable improvement in impact strength is thereby produced.

The metal acid catalyst or Lewis Acid is selected from a general class of soluble metal salts of the transition metals. These include aluminum, calcium, titanium, vanadium, chromium, manganese, iron, cobalt, nickel, copper, zinc and strontium. Metal chlorides such as $AlCl_3$ and metal nitrates are the preferred metal salts.

DESCRIPTION OF THE PREFERRED EMBODIMENTS

EXAMPLE I

A sizing composition comprising an aqueous dispersion of the following materials is prepared as follows:

| Material | Percent by weight |
| --- | --- |
| Epoxy A | 0.1 –2.0 (active solids) |
| Epoxy B | 0.1 –3.0 (active solids) |
| Epoxy C | 0.1 –2.0 (active solids) |
| Glacial acetic acid | 0.1 –0.5 |
| Paintable silicon fluid emulsion | 0.1 –1.0 |
| Gamma glycidoxypropyltrimethoxysilane | 0.05 –0.8 |
| Polyvinyl acetate copolymer | 3.0 –10.0 (active solids) |
| Ionic solution of $AlCl_3$ | 0.06 –0.36 (active solids) |
| Deionized Water | Balance |

The pH of the finished size should be from 4.0 to about 5.0.

EXAMPLE II

An aqueous dispersion is made of the following materials:

| Material | Percent by weight |
| --- | --- |
| Epoxy A | 0.38 (active solids) |
| Epoxy B | 1.07 (active solids) |
| Epoxy C | 0.19 (active solids) |
| Glacial acetic acid | 0.16 |
| Paintable silicon fluid emulsion | 0.30 |
| Gamma glycidoxypropyltrimethoxysilane | 0.40 |
| Polyvinyl acetate copolymer | 6.6 |
| Ionic solution of $AlCl_3$ | 0.18 |
| Deionized water | Balance |

The pH of the dispersion should be approximately 4.5.

The materials were mixed together by combining acetic acid with epoxies A, B, and C. The resinous mixture was heated to 120°–140° F. and then cool, deionized water (45°–65° F.) was added slowly to the heated mixture with thorough and vigorous agitation (Lightnin' mixer is suitable) until the resinous mixture inverts from a slightly viscous to a highly viscous state. Upon inversion, an additional gallon of water is added. This mixture is agitated for about 10 minutes and further diluted with 20 gallons of water. Subsequently, polyvinyl acetate copolymer, $AlCl_3$, gamma glycidoxypropyltrimethoxysilane and the paintable silicon fluid emulsion are added to the mixture. Additional water is added in order to adjust the solids of the mixture from about 6.0 to about 12.0 percent.

Epoxy A — This material is prepared by dissolving approximately 1,500 parts by weight of the general type of epoxide shown below, having an "n" of 3.6 with 1,500 parts by weight of diacetone alcohol in a 4-liter Pyrex reactor kettle having a motor drum agitator therein and surrounded by a Glas Col heated mantle controlled by a Variac.

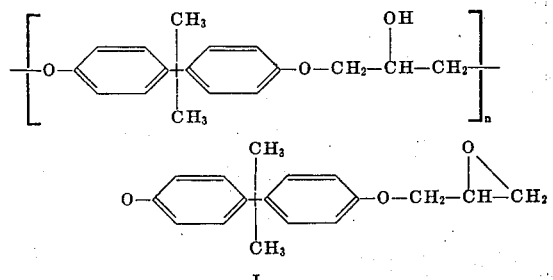

I

The vessel is suitably closed off, and is provided with a reflux condenser to prevent the escape of solvents and/or reactants. Approximately 64 parts by weight of diethanolamine is added with mixing. The temperature is raised to 100° C. with continuous mixing and held at 100° C. for 1 hour to provide ample time to react all of the amine. The material produced by the above reaction was essentially that indicated by the following formula, having a single terminal solubilizing group at one end:

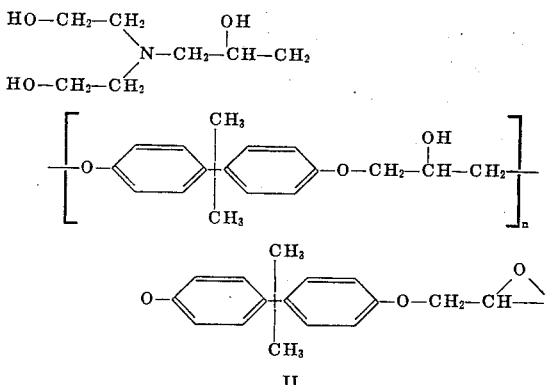

II

Epoxy B — This material is prepared by dissolving approximately 805 parts by weight of the general type of epoxide indicated by Structure I having an "n" of about 3.6, with 345 parts by weight of xylene in a 2-liter Kimax reactor kettle having a motor driven agitator therein and surrounded by a Glas Col heated mantle controlled by a Variac. The vessel is suitably closed off, and is provided with a reflux condenser to prevent the escape of solvents and/or reactants. The mixture is heated to 105° C. with stirring to thoroughly dissolve the resin and thereafter the temperature is raised to 120° C. and approximately 65 parts by weight diethanolamine is added slowly with continuous mixing. The products are held at approximately 120° C. for about 1 hour to provide ample time to react all of the amine. The material produced by the above reaction is essentially that of Structure II shown before, and contains a preponderance of molecules having a single terminal solubilizing group at one end.

Thereafter a polyglycol monoester, such as a polyglycol monooleate, is added and reacted with the remaining oxirane groups. Approximately 400 parts by weight of a commercially available polyethyleneglycol monooleate having a molecular weight of about 400 is added to the reaction kettle using about 2.5 parts by weight of a basic catalyst (as for example potassium carbonate), and the mixture heated to maintain 120° C. for 4 hours. The resulting material has an epoxy equivalent of 3,000, indicating one epoxy equivalent for 3,000 gm. of the material. The material produced by the above reaction is shown by the following formula showing the preponderance of molecules that have terminal solubilizing groups at both end of the molecule:

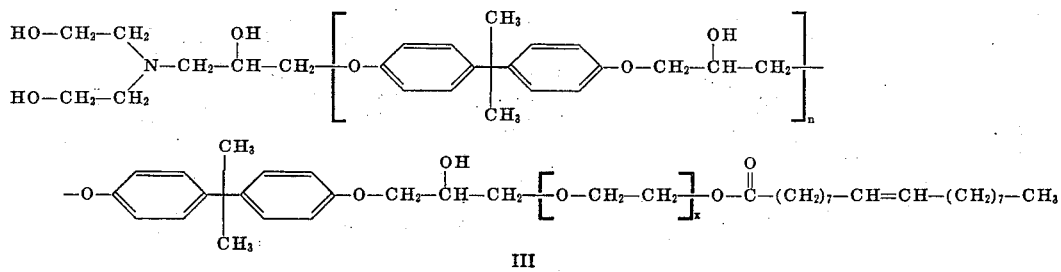

III wherein x = 8 to 10.

Epoxy C — This material is prepared by dissolving approximately 530 parts by weight of the general type of epoxide indicated by Structure I having an "n" of about 3.6 with 390 parts of xylene in a 3-liter Pyrex reactor kettle having a motor driven agitator therein and surrounded by a Glas Col heated mantle controlled by a Variac. The vessel is suitably closed off, and is provided with a reflux condenser to prevent the escape of solvents and/or reactants. The mixture is heated to 105° C. with stirring to thoroughly dissolve the resin, and thereafter the temperature is raised to 120° C. and approximately 43 parts of diethanolamine is added slowly with continuous mixing. The products are held at approximately 120° C. for about 1 hour to provide ample time to react all of the amine. The material produced by the above reaction is essentially that of Structure II shown before, and contains a preponderance of molecules having a single terminal solubilizing group at one end.

Thereafter a polyglycol monoester, such as a polyglycol monooleate, is added and reacted with the remaining oxirane groups. Approximately 720 parts by weight of a commercially available polyethyleneglycol monooleate having a molecular weight of about 1,500 is added to the reaction kettle using about 2.5 parts by weight of a basic catalyst (for example potassium carbonate) and the mixture heated to maintain 120° C. for 4 hours. The reaction vessel is cooled to about 200° F. and about 100 parts of diacetone alcohol or other polar solvent is added and this solution stirred while cooling to room temperature. The material produced by the above reaction is shown by the formula showing the preponderance of molecules that have terminal solubilizing groups at both ends of the molecule:

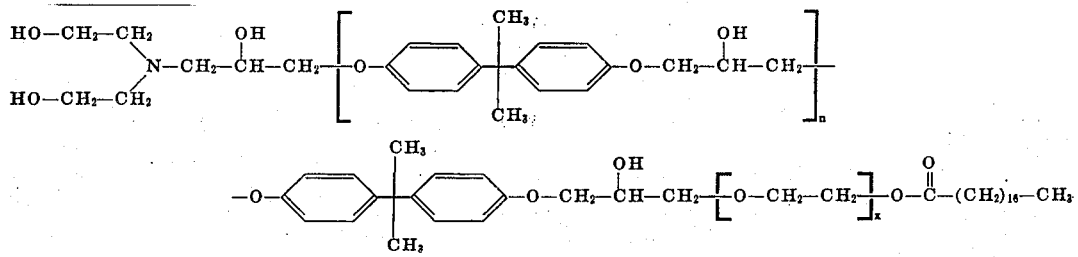

IV wherein x = 28 to 36.

The paintable silicon fluid emulsion is commercially available under the trade name SM-2050 from General Electric Company. The gamma-glycidoxypropyltrimethoxysilane is commercially available under the trade names A-187 and Z-6020 from Union Carbide Corporation and Dow-Corning Corporation respectively. The polyvinyl acetate:N-methylol acrylamide copolymer emulsion is commercially available under the designation 25-2828 from National Starch Company. The $AlCl_3$ is commercially available under the designation 42-2301 from National Starch Company.

Eight hundred sixteen continuous filament glass fibers approximately 0.00050 inch in diameter were produced by attenuating molten streams of glass at a rate of approximately 10,000 feet per minute. The glass fibers, immediately after solidification, were pulled over a graphite applicator that was flooded with the aqueous dispersion given above. The coated fibers were brought together into a strand by the applicator, and the strand was then wound on a rotating drum mounted on a revolving spindle which pulled the fibers at a rate of approximately 10,000 feet per minute. A suitable traverse mechanism moved the strand back and forth across the drum to produce a coiled package approximately 12 inches wide, with an inside diameter of approximately 8 inches, an outside diameter of approximately 12 inches, and tapered sides. The package was removed from the spindle and dried in an oven at a temperature of about 265° F. for approximately 8 to 20 hours. Thereafter the strand was unwound from the package and chopped into one quarter inch lengths.

A matrix resin mix was made from the following ingredients:

| Ingredients | Parts by Weight |
|---|---|
| Unsaturated polyester resin (1 mol phthalic anhydride, 1 mol maleic anhydride, 2 mols propylene glycol cooked to an acid number of 30–35 and diluted with 30% styrene solvent) | 2011.0 |
| Tertiary Butyl Perbenzoate | 13.2 |
| Benzoyl Peroxide | 6.0 |
| Zinc Stearate | 80.0 |

The resin mix was produced by charging the polyester resin to a cowles mixer, and thereafter slowly adding the other ingredients while the mixer was running to thoroughly disperse the ingredients throughout the resin.

A Molding Premix was made from the following ingredients:

| Ingredients | Parts by Weight |
|---|---|
| Above resin mix | 1763.0 |
| Calcium Carbonate –325 mesh filter | 315.0 |
| Clay filler | 2832.0 |
| ¼ inch chopped strands given above (98 percent glass) | 1080.0 |

The Molding Premix was made by adding the resin mix to a Baker-Perkins sigma blade type mixer, and adding the clay and the calcium carbonate fillers while the mixer was running. After the above ingredients were dispersed in the resin, the mixer was run for an additional 6–8 minutes to assure a uniform dispersion. Thereafter, the quarter inch chopped strands were blended in during a 30-second period, and the mixer was run for an additional 1½-minute period to assure a uniform dispersion of the strand throughout the mixture of other ingredients. The chopped strands showed a slight degree of filamentation after mixing, which is a desirable characteristic of glass strands treated according to the inventive concept.

The chemically reactive polyvinyl acetate copolymer undergoes a high degree of crosslinking thereby producing a tough, hard coating on the glass fiber strands that possesses a highly insoluble characteristic with a resinous matrix. The insolubility characteristic becomes extremely important when preparing a premix compound and/or when an injection molding machine is used, because it controls the degree of filamentation of glass filaments from the strand into a multiplicity of discreet bundles, smaller in diameter than the original strand. Some filamentation is desirable but too much or too little is undesirable. This desirability has been proven by conducting impact tests upon the reinforced structures. Analysis shows that impact strengths are greatest when there is some degree of filamentation of the glass filaments from the strand.

In addition to the chemically reactive polyvinyl acetate copolymer, the combination of special epoxy resins, used in the treatment that coats the glass filaments, functions as a lubricant between the filaments that make up the glass strand. This characteristic becomes extremely important when the glass strand is unwound from the dried forming package prior to going to the chopper. Apparently, the combination of epoxy resins allows the polyvinyl acetate to crosslink on the strand during drying but prevents crosslinking of the coating from strand to strand on the forming package. Without this lubricity characteristic, there is a slight strand-to-strand bonding on the package, sufficient in strength that upon removal of the strand from the package, the strand separates from itself thereby destroying its integrity, and furthermore causes fuzzing and broken strands. When the integrity of the strand is destroyed, the advancing strand at the chopper tends to foul the chopper thereby cutting down on the chopper efficiency and the uniformity of the length of chopped strands.

I claim:

1. Glass fiber strands having a dried coating of a sizing composition comprising in percent by weight:

Epoxy A, having the following formula: 0.1–2.0 (active solids)

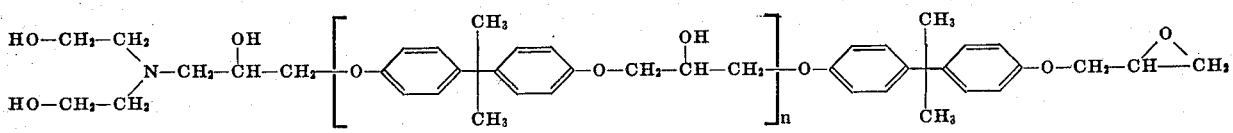

wherein $n$ = about 3.6

Epoxy B, having the following formula: 0.1–3.0 (active solids)

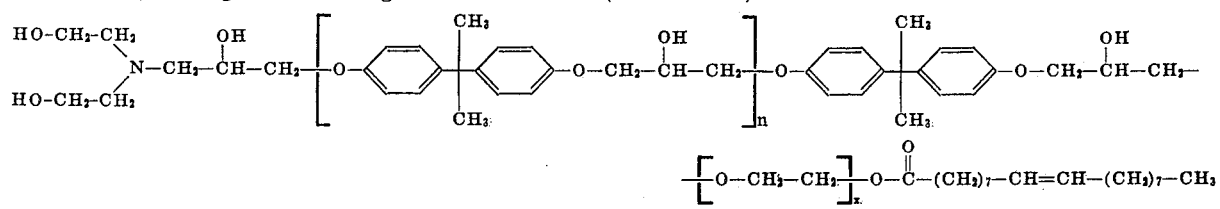

wherein x=8 to 10 and wherein n=about 3.6

Epoxy C, having the following formula: 0.1–2.0 (active solids)

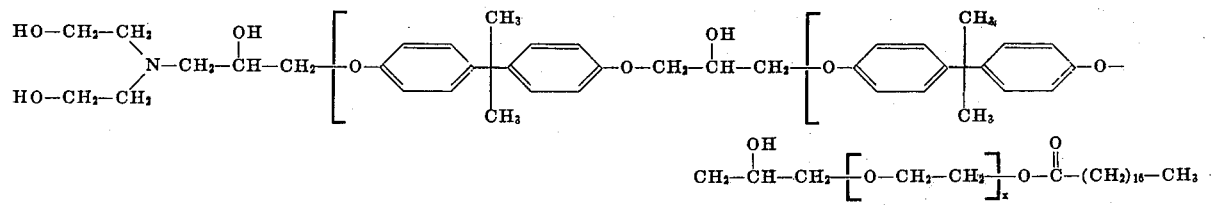

wherein x=28 to 36, and wherein n=about 3.6

| Glacial acetic acid | 0.1 –0.5 |
| Paintable silicon fluid emulsion | 0.1 –1.0 |
| Gamma - glycidoxypropyltrimethoxysilane | 0.05 –0.8 |
| Polyvinyl acetate :N-methylol acrylamide copolymer | 3.0–10.0 (active solids) |
| Ionic solution of AlCl₃ | 0.06–0.36 (active solids) |
| Deionized water | Balance |

2. Chopped glass strands having the dried coating as claimed in claim 1.

3. Glass fiber strands having a dried coating of a sizing composition comprising in percent by weight:

| Glacial acetic acid | 0.16 |
| Paintable silicon fluid emulsion | 0.30 |
| Gamma —glycidoxypropyltrimethoxysilane | 0.40 |
| Polyvinyl acetate :N-methylol acrylamide copolymer | 6.6 (active solids) |
| Ionic solution of AlCl₃ | 0.18 (active solids) |
| Deionized water | Balance |

4. Chopped glass strands having the dried coating as claimed in claim 3 wherein the chopped glass strands possess substantial integrity.

Epoxy A, having the following formula: 0.38 (active solids)

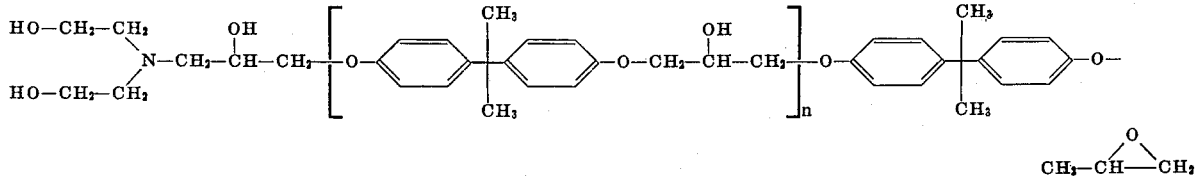

wherein n=about 3.6

Epoxy B, having the following formula: 1.07 (active solids)

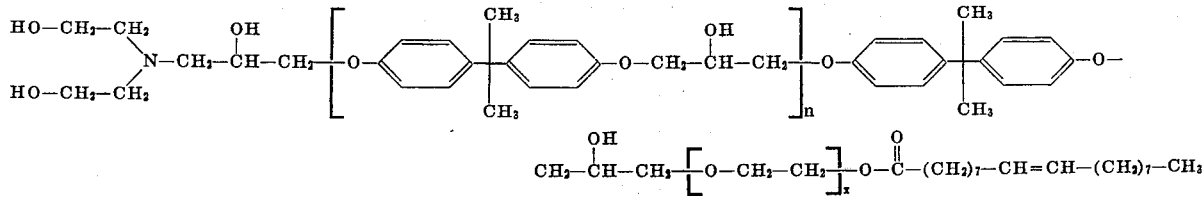

wherein x=8 to 10, and wherein n=about 3.6

Epoxy C, having the following formula: 0.19 (active solids)

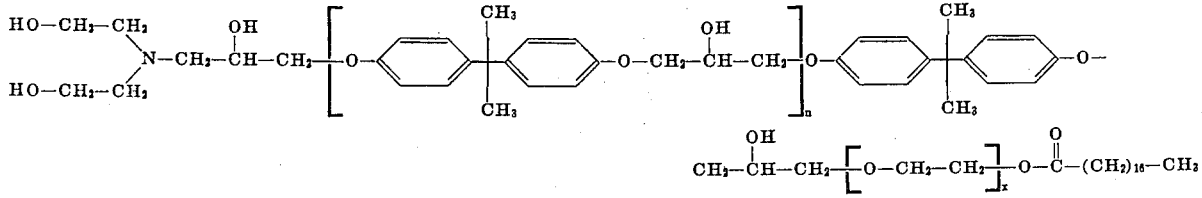

wherein x=28 to 36, and wherein n=about 3.6